United States Patent
Howk et al.

(10) Patent No.: US 10,670,034 B2
(45) Date of Patent: Jun. 2, 2020

(54) TRIMABLE IMPELLER DEVICE AND SYSTEM

(71) Applicant: SPX FLOW, INC., Charlotte, NC (US)

(72) Inventors: Richard Howk, Pittsford, NY (US); Richard Kehn, Avon, NY (US); Aaron Strand, Pittsford, NY (US)

(73) Assignee: SPX Flow, Inc., Charlotte, NC (US)

( * ) Notice: Subject to any disclaimer, the term of this patent is extended or adjusted under 35 U.S.C. 154(b) by 627 days.

(21) Appl. No.: 15/165,188

(22) Filed: May 26, 2016

(65) Prior Publication Data

US 2017/0343004 A1  Nov. 30, 2017

(51) Int. Cl.
| | |
|---|---|
| *B01F 7/00* | (2006.01) |
| *F04D 29/18* | (2006.01) |
| *B01J 19/00* | (2006.01) |
| *F04D 25/02* | (2006.01) |
| *F04D 29/043* | (2006.01) |
| *F04D 29/52* | (2006.01) |

(52) U.S. Cl.
CPC ........ *F04D 29/181* (2013.01); *B01F 7/00341* (2013.01); *B01J 19/0066* (2013.01); *F04D 25/02* (2013.01); *F04D 29/043* (2013.01); *F04D 29/528* (2013.01); *B01F 2215/0422* (2013.01); *F05D 2230/10* (2013.01); *F05D 2230/61* (2013.01)

(58) Field of Classification Search
CPC ...... F04D 29/181; F04D 29/183; F04D 29/24; F04D 29/242; F04D 29/528; B01F 7/00016; B01F 7/00233; B01F 7/00341; B01F 7/00366; B01F 7/16; B01F 7/22; B01F 7/00291

USPC ................................ 366/330.1–330.7, 325.1
See application file for complete search history.

(56) References Cited

U.S. PATENT DOCUMENTS

| | | | | |
|---|---|---|---|---|
| 4,147,437 A | * | 4/1979 | Jonqueres | B01F 7/00341 366/343 |
| 4,468,130 A | * | 8/1984 | Weetman | B01F 7/00341 366/330.2 |
| 4,605,355 A | * | 8/1986 | Davis | B64C 11/04 415/912 |
| 4,669,164 A | | 6/1987 | Phelps | |
| 4,721,394 A | | 1/1988 | Casto et al. | |
| 5,158,434 A | * | 10/1992 | Weetman | B01F 7/00341 366/330.5 |

(Continued)

FOREIGN PATENT DOCUMENTS

WO    00/35570 A2    6/2000

*Primary Examiner* — Ninh H. Nguyen
*Assistant Examiner* — Behnoush Haghighian
(74) *Attorney, Agent, or Firm* — BakerHostetler

(57) ABSTRACT

An impeller includes a hub and a plurality of blades. Each blade extends out from the hub. The impeller has an original diameter defined by respective tips of the plurality of blades. Each blade includes a central axis, a leading edge, a trailing edge, an original profile, and a plurality of trim profiles. The original profile has an outside portion and a trailing portion. The outside portion has an angle within a range of about 40° to about 90° from the central axis and the trailing portion having an angle within a range of about 10° to about 50° from the central axis. A first selected trim profile of the plurality of trim profiles extends along a first line parallel to the outside portion and a second line parallel to the trailing portion.

4 Claims, 13 Drawing Sheets

(56) References Cited

U.S. PATENT DOCUMENTS

| | | | |
|---|---|---|---|
| 5,951,162 A | 9/1999 | Weetman et al. | |
| 6,866,414 B2* | 3/2005 | Kupidlowski | B01F 7/001 |
| | | | 366/330.3 |
| 9,138,698 B2* | 9/2015 | Lilja | B01F 7/00341 |
| 2002/0119048 A1 | 8/2002 | Burgess | |
| 2002/0176322 A1 | 11/2002 | Kupidlowski | |
| 2005/0162973 A1* | 7/2005 | Katz | A47J 43/0711 |
| | | | 366/343 |

* cited by examiner

TRIMABLE IMPELLER DEVICE AND SYSTEM

FIELD OF THE INVENTION

The present disclosure generally relates to an impeller. More particularly, the present disclosure pertains to a base impeller configured to be trimmed to a plurality of different diameters.

BACKGROUND

It is generally known that impellers are utilized to keep fluids mixed and/or particulates in suspension when stored in containers. Typically, the impeller is placed relatively close to the bottom of the container to aid in mixing and to allow for mixing as the container becomes empty. Based on a variety of factors, it may be advantageous for impellers to be available in a range of sizes. Examples of factors that may influence the diameter of an impeller may include, for example: the volume of fluid to be mixed; the shape of the mixing container; the size of the opening in the container; the speed and/or torque rating of the motor rotating the impeller; the viscosity of fluid to be mixed; the particulate size and/or burden of fluid to be mixed; and the like. However, it may not be cost effective to produce impellers in a range diameters due to the costs associated with generating the molds or dies and/or the costs associated with maintaining a stock of impellers in the various diameters. Accordingly, it is desirable to provide an impeller that is capable of overcoming the disadvantages described herein at least to some extent.

SUMMARY

The foregoing needs are met, at least to some extent, by embodiments the present disclosure, wherein in one respect an impeller is provided that is capable of being trimmed to different diameters.

An embodiment relates to an impeller includes a hub and a plurality of blades. Each blade extends out from the hub. The impeller has an original diameter defined by respective tips of the plurality of blades. Each blade includes a central axis, a leading edge, a trailing edge, an original profile, and a plurality of trim profiles. The original profile has an outside portion and a trailing portion. The outside portion has an angle within a range of about 40° to about 90° from the central axis and the trailing portion has an angle within a range of about 10° to about 50° from the central axis. A first selected trim profile of the plurality of trim profiles extends along a first line parallel to the outside portion and a second line parallel to the trailing portion.

Another embodiment pertains to an impeller assembly includes a shaft and an impeller. The shaft has a first end and a second end. The first end is configured to be rotated by a motor. The impeller is disposed at the second end, the impeller includes a hub affixed to the second end of the shaft and a plurality of blades. Each blade extends out from the hub. The impeller has an original diameter defined by respective tips of the plurality of blades. Each blade includes a central axis, a leading edge, a trailing edge, an original profile, and a plurality of trim profiles. The original profile has an outside portion and a trailing portion. The outside portion has an angle within a range of about 40° to about 90° from the central axis and the trailing portion has an angle within a range of about 10° to about 50° from the central axis. A first selected trim profile of the plurality of trim profiles extends along a first line parallel to the outside portion and a second line parallel to the trailing portion.

Yet another embodiment relates to a mixing system including a container, a motor, and an impeller assembly. The impeller assembly includes an impeller and a shaft having a first end and a second end. The motor is configured to rotate the first end. The impeller disposed at the second end. The impeller includes a hub affixed to the second end of the shaft and a plurality of blades. Each blade extends out from the hub. The impeller has an original diameter defined by respective tips of the plurality of blades. Each blade includes a central axis, a leading edge, a trailing edge, an original profile, and a plurality of trim profiles. The original profile has an outside portion and a trailing portion. The outside portion has an angle within a range of about 40° to about 90° from the central axis and the trailing portion has an angle within a range of about 10° to about 50° from the central axis. A first selected trim profile of the plurality of trim profiles extends along a first line parallel to the outside portion and a second line parallel to the trailing portion.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosed device and method is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various embodiments. It is important, therefore, that the claims be regarded as including such equivalent constructions insofar as they do not depart from the spirit and scope of the various embodiments.

DETAILED DESCRIPTION OF THE PREFERRED EMBODIMENT

Various aspects of the impeller described herein are suitable for use with a mixing apparatus and particularly to an apparatus for the mixing of liquids and liquid suspensions of solids and gases contained in vessels. More particularly, some aspects of the impeller described herein are suitable for use in mixing equipment for chemical processes and may be suitable for use with mixers for solid suspensions, emulsifiers, and aerators, as well as in other mixing operations.

Figure 1:
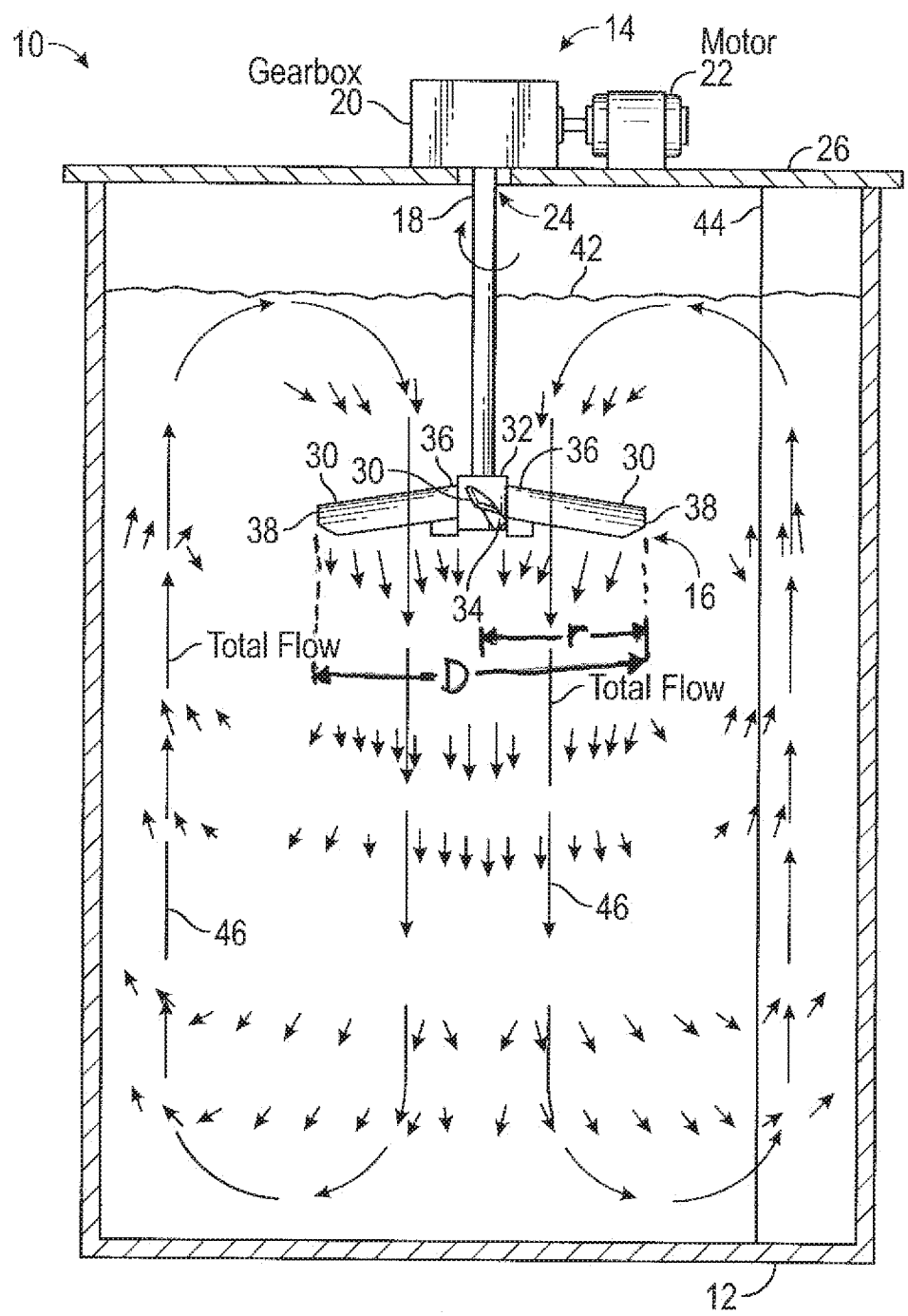
FIG. 1 is a cutaway perspective view of an impeller system being utilized with a container suitable for use with an embodiment.

An embodiment will now be described with reference to the drawing figures, in which like reference numerals refer to like parts throughout. FIG. 1 is a cutaway perspective view of an impeller system 10 being utilized with a container 12 suitable for use with an embodiment. As shown in FIG. 1, the impeller system 10 includes an impeller assembly 14. The impeller assembly 14 includes and impeller 16 and shaft 18. The impeller system 10 further includes a gearbox 20, and motor 22. The container 12 includes any suitable container or vessel such as, for example, a barrel, a tank, a trough, a pipe, or the like.

In general, the motor 22 is configured to rotate the shaft 18. The shaft 18 is configured for insertion down through a port 24 in a lid 26 of the container 12. Rotation of the shaft 18 urges the impeller assembly 14 to rotate. More particularly, the impeller 16 is urged to rotate. As shown in FIG. 1, the impeller 16 includes a plurality of blades 30 mounted to a hub 32. In some examples, the impeller 16 may include three blades 30 and in other examples, the impeller 16 may include two, four, or more blades 30.

In some aspects, the blades 30 may include double surfaced, cambered airfoil profile 34 to provide substantially axial flow throughout the mixing vessel at high efficiency (maximization of Q/P, where Q is the axial flow in gallons per minute and P is energy in horsepower). The airfoil profile 34 of the blades 30 may be formed by an upper and lower skin that may twist and vary in thickness along the length of the blade 30 from a root 36 of each blade 30 to a tip 38 of each blade 30.

In FIG. 1, a fluid fills the container 12 to the level shown by the wavy line 42. The container 12 may be equipped with one or more vanes or baffles 44 which extend radially from the walls of the container 12. The principal direction of the flow is axial; that is, in the direction of the axis of the shaft 18 which is the axis of rotation of the impeller 16. Flow is pumped downwardly in the direction of the vectors which, by their length, indicate the velocity magnitude of the flow, and by their direction, the direction of the flow. The loops 46 show the direction of the total flow in the container 12, which is axially downward in the direction of pumping by the impeller 16 and then upward along the wall of the container 12. The upward flow is constrained somewhat by the baffle 44. The principal axial component of the flow is obtained due to the action of the impeller 16. In the impeller system 10 shown in FIG. 1, the container 12 diameter T is approximately three times the diameter D of the impeller 16. The diameter D of the impeller 16 is defined as the diameter of the circle encompassed by the outer edge of the respective tips 38 of the blades 30. This is the D/T ratio. A ratio of 1/3 is typical for mixing devices such as the impeller system 10. The ratio used does not substantially affect the flow pattern inasmuch as the impeller pumps the fluid in a substantially axial direction. Downward pumping is shown, inasmuch as such is typical in solids suspension mixing devices. Upward pumping may be obtained by inverting the impeller 16 and rotating it in the opposite direction. In such case, the impeller 16 would be located closer to the bottom of the container 12.

Figure 2:
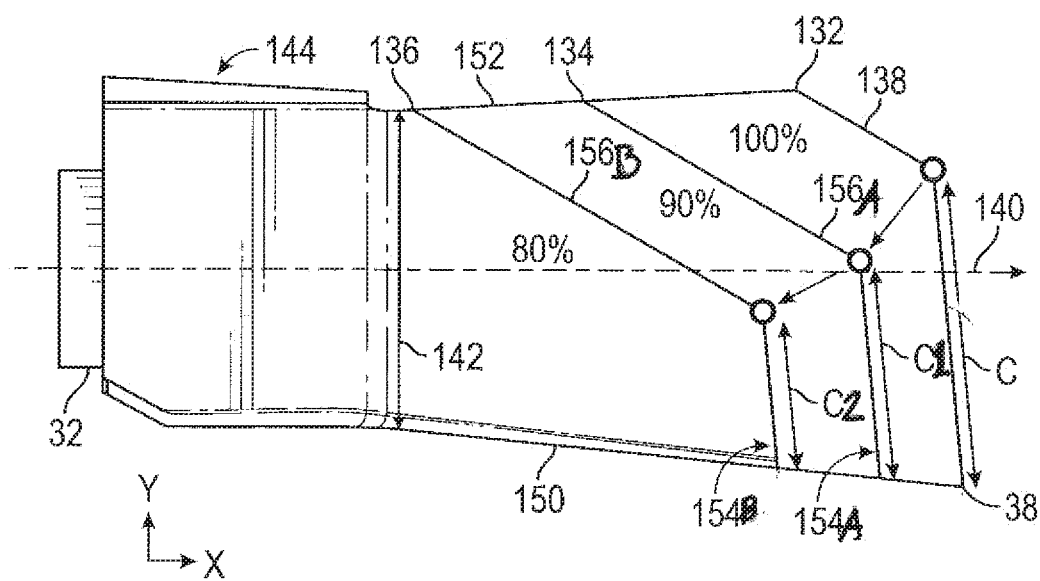
FIG. 2 is a top view of a blade of an impeller showing trim profiles in accordance with an embodiment.

FIG. 2 is a top view of the blade 30 of the impeller 16 showing an original profile 132 and a plurality of trim profiles 134-136 in accordance with an embodiment. It is an advantage of the blade 30 that the blade 30 spans a wide range of diameters with a single initial blade geometry. It is another advantage that the blade 30 displays a less than 5% increase in power number of the impeller 16 (Np) for 20% diameter reduction using this two cut method. It is another advantage that the blade 30 displays a less than a 10% loss in flow number (Nq) for 20% reduction in diameter. It is another advantage that the trim profiles 134-136 are parallel to the original profile 132 for simplicity. It is another advantage that the blade 30 outperforms the single cut trimming methods for conventional impellers.

As shown in FIG. 2, the blade 30 includes a central axis 140 and a chord 142 running perpendicular to the central axis 140. In addition, the blade 30 includes a flow accelerator 144, a tip 38, the hub 32, a leading edge 150, a trailing edge 152, and at the original profile 132 and each trim profile 134-136, the blade 30 includes a respective radius r and diameter D (Shown in FIG. 1). In order to generate each of the trim profiles 134-136, a first cut $154_A$ or $154_B$ is generated parallel to an original profile $132_{outside}$ of the original profile 132 and a second cut $156_A$ or $156_B$ is generated parallel to an original profile $132_{Trailing}$ of the original profile 132 and intersects the first cut $154_A$ or $154_B$ a chord length $C_1$ or $C_2$ from the leading edge 150. The chord length C may be defined by any suitable equation. In an example, a suitable equation may include the following equation:

$$C = -0.02*D2 + 0.8*D - 6.2 \qquad 1$$

Where D is the diameter of the impeller 16. In this regard, although the trim profiles 134-136 may represent a predetermined set of lines at 90% and 80%, respectively, of the original diameter of the impeller 16, other trim profiles may be calculated based on the Eq. 1. For example, the impeller 16 may be trimmed by first cutting each of the blades 30 at 85% the diameter D parallel to the original profile 132$_{Outside}$ and then cutting a line parallel to the original profile 132$_{Trailing}$ while intersecting the first cut line at a distance C from the leading edge 150. In this manner, the impeller 16 may be custom sized. Of note, the original profile 132 is also defined by the Eq. 1.

In the particular example shown in FIG. 2, the original profile 132$_{Outside}$ is about 85°±10° from the axis 140 and the original profile 132$_{Trailing}$ is about 30°±10° from the axis 140. However, in other examples, the original profile 132$_{Outside}$ may be within a range of about 60° to about 90° from the axis 140 and the original profile 132$_{Trailing}$ may be within a range of about 20° to about 45° from the axis 140. In addition, the leading edge 150 and trailing edge 152 diverge from the axis 140 at about 3°±10° to generate a flare in the profile of the blade 30 at the full size. This flare of the trailing edge 152 is removed or reduced in response to trimming.

Figure 3:
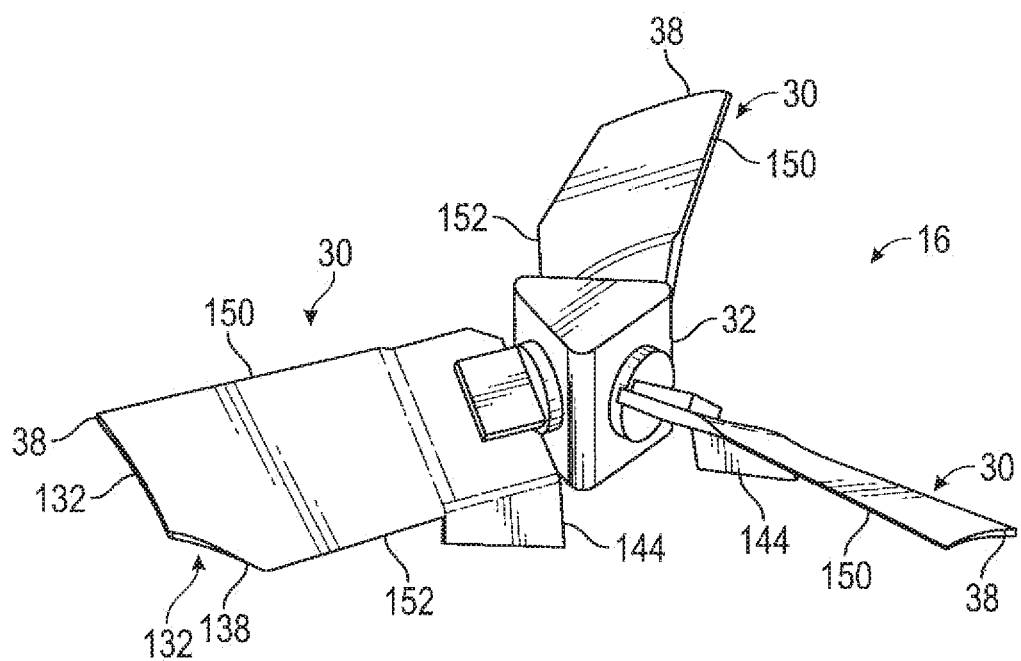
FIG. 3 is a perspective view of the impeller at 100% diameter in accordance with an embodiment.
Figure 4:
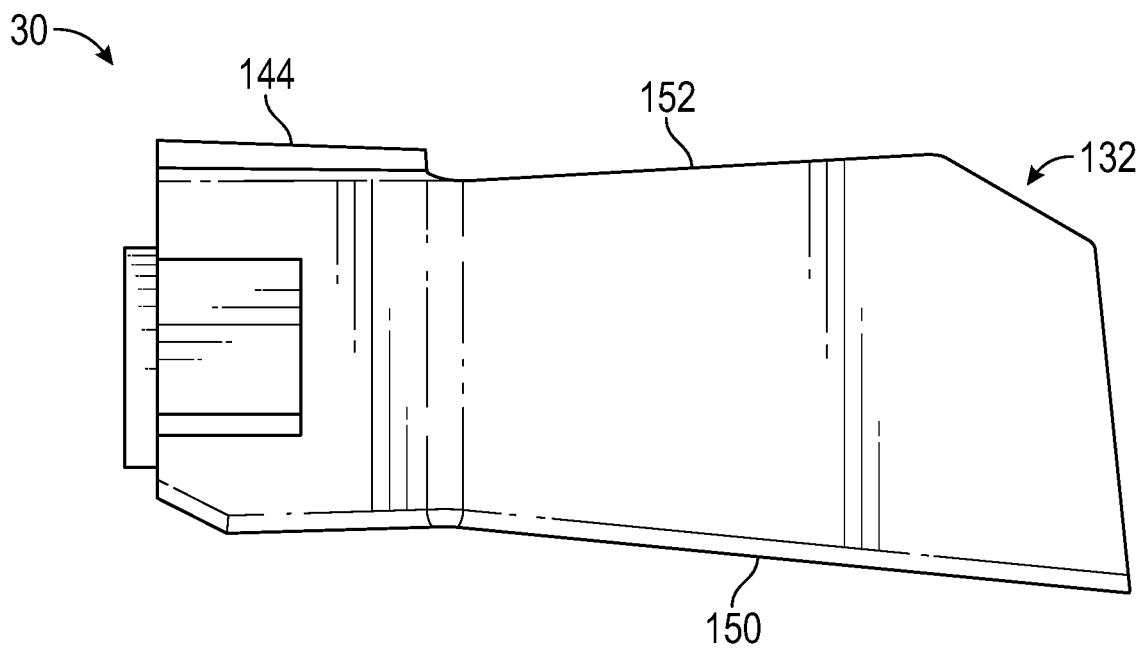
FIG. 4 is a top view of the blade at 100% diameter in accordance with an embodiment.
Figure 18:
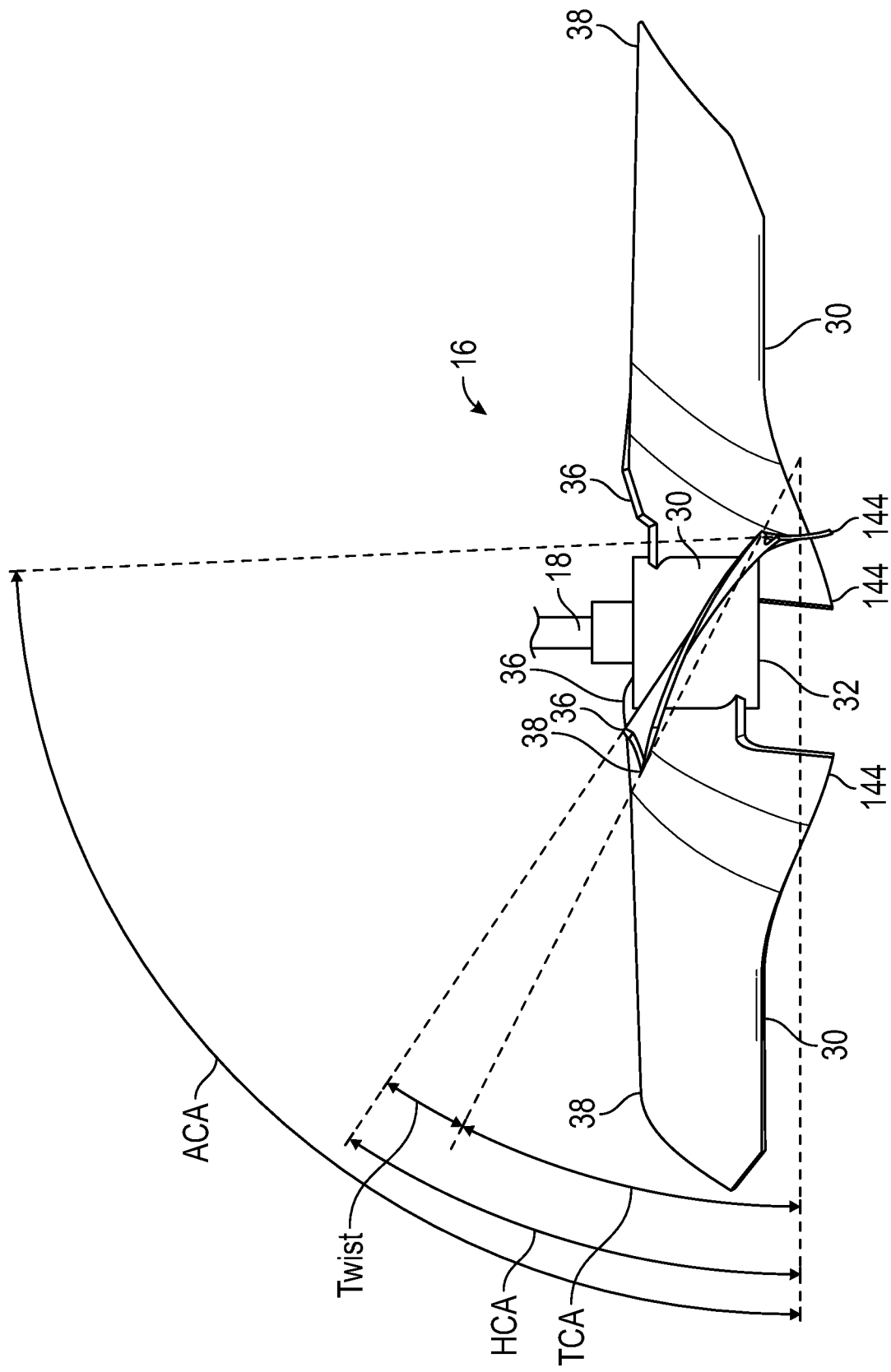
FIG. 18 is a side view of the impeller showing tip chord angle, hub chord angle, and twist in accordance with an embodiment.

FIGS. 3-8 are alternating perspective and top views of the impeller at different diameters in accordance with an embodiment. In FIGS. 3 and 4, the impeller 16 is shown at full-sized or 100% diameter. Of note, the flow accelerators 144 are particularly evident in FIG. 3. In operation, as the impeller 16 is rotated, the speed at which the tip 38 moves through a surrounding fluid is relatively greater than the portions of the blade 30 that are closer to the hub 32. All other things being equal, the faster tip speed would cause a disproportionate portion of the fluid thrust to be generated at or near the tip 38. As shown herein, the flow accelerators 144 are configured to facilitate equalizing the fluid thrust along the length of the blade 30. For example, the flow accelerators 144 extend from the trailing edge 152 at an angle that is the same or relatively steeper than a hub chord angle of the blade 30. For example, if the hub chord angle is 30°, the flow accelerators 144 may extend from the trailing edge 152 at an angle relative to horizontal between about 30° to about 60° and cause fluid to depart from this portion of the blade 30 at an angle that is relatively steeper angle than a chord angle of the chord 142 (shown in FIG. 2). A more detailed disclosure of the tip chord angle (TCA), hub chord angle (HCA), accelerator chord angle (ACA) is shown in FIG. 18 and described herein with reference to FIG. 18. In addition, the flow accelerators 144 may taper such that they have a relatively greater chord length proximal to the hub 32 in comparison to a chord length that is distal from the hub 32.

Figure 5:
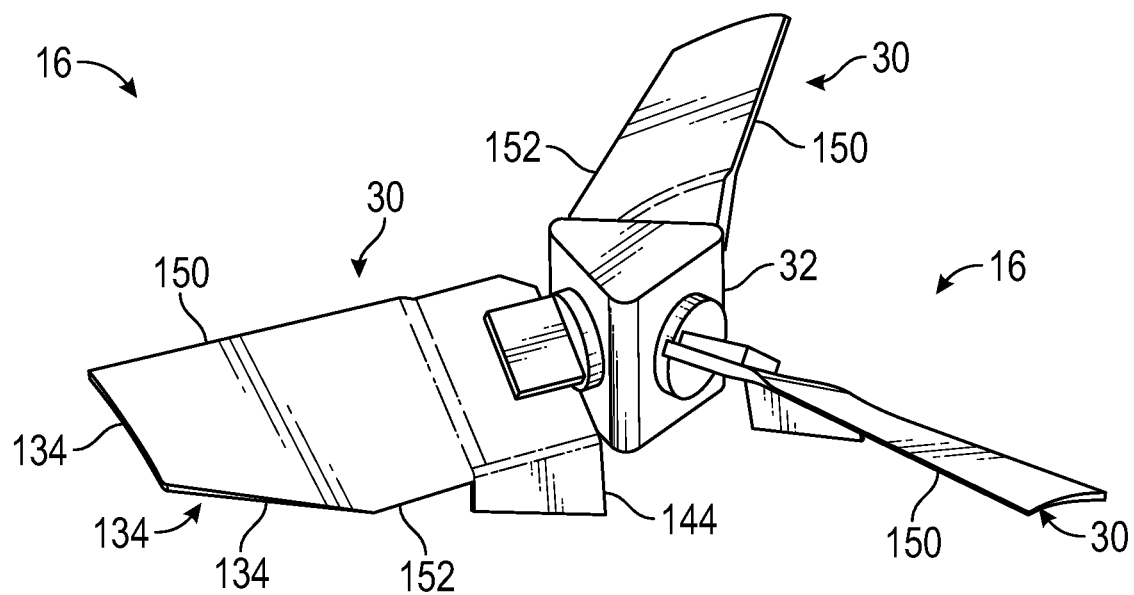
FIG. 5 is a perspective view of the impeller at 90% diameter in accordance with an embodiment.
Figure 6:
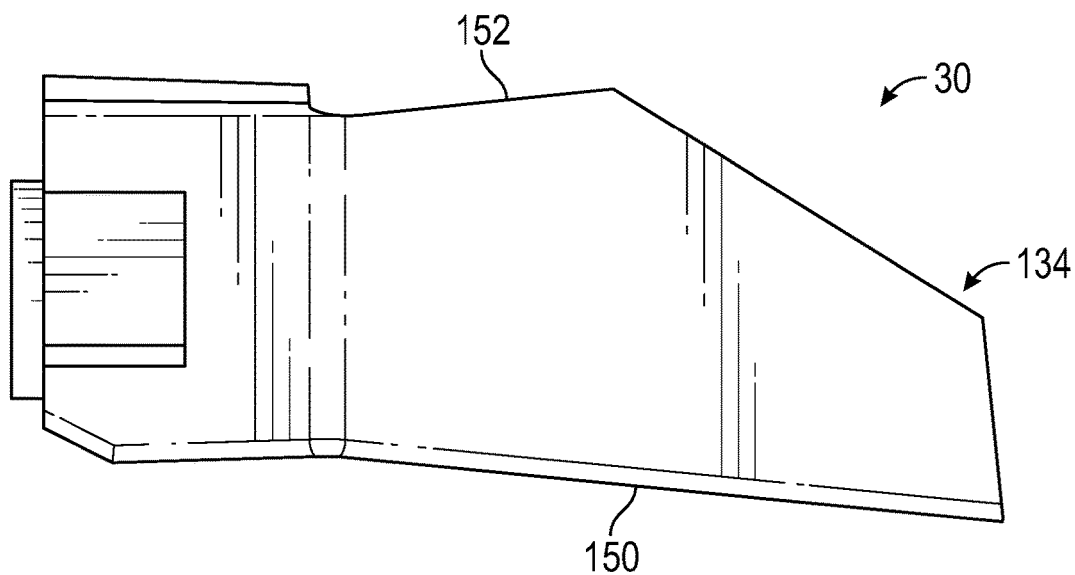
FIG. 6 is a top view of the blade at 90% diameter in accordance with an embodiment.
Figure 7:
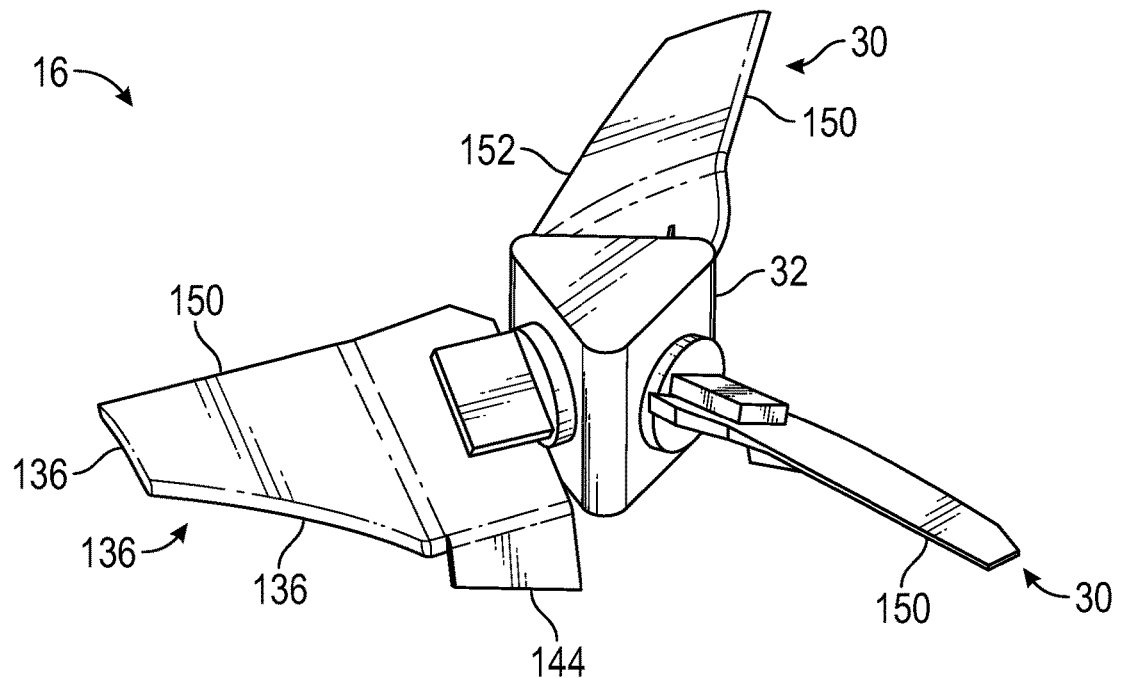
FIG. 7 is a perspective view of the impeller at 80% diameter in accordance with an embodiment.
Figure 8:
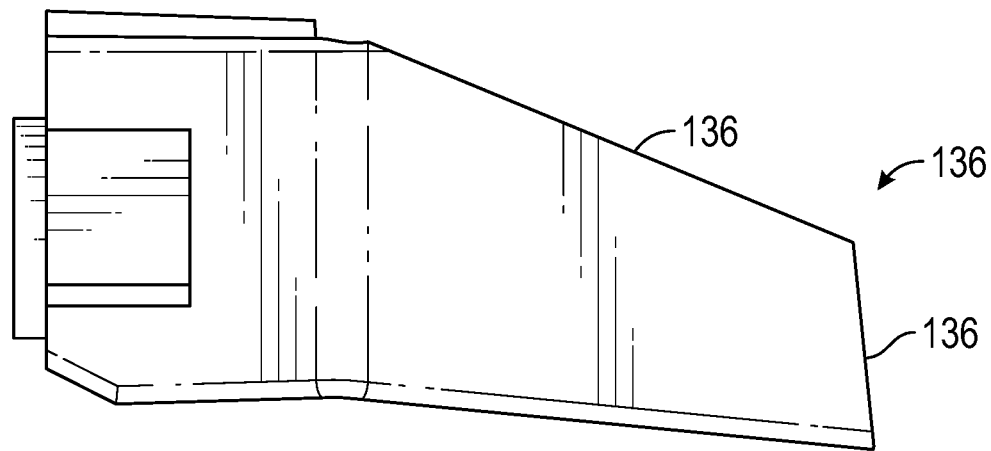
FIG. 8 is a top view of the blade at 80% diameter in accordance with an embodiment.

In FIGS. 5 and 6, the impeller 16 is shown at 90% diameter. As shown in FIGS. 5 and 6, a trailing edge 138$_{Trailing}$ of the trim profile 134 is relatively longer than the original profile 132$_{Trailing}$ shown in FIGS. 3 and 4 and the trailing edge 152 has been reduced in the impeller 16 is shown at 90% diameter. This trend continues as shown in FIGS. 7 and 8 in which the trailing edge 152 of the impeller 16 at 80% diameter has been essentially removed.

Figure 9:
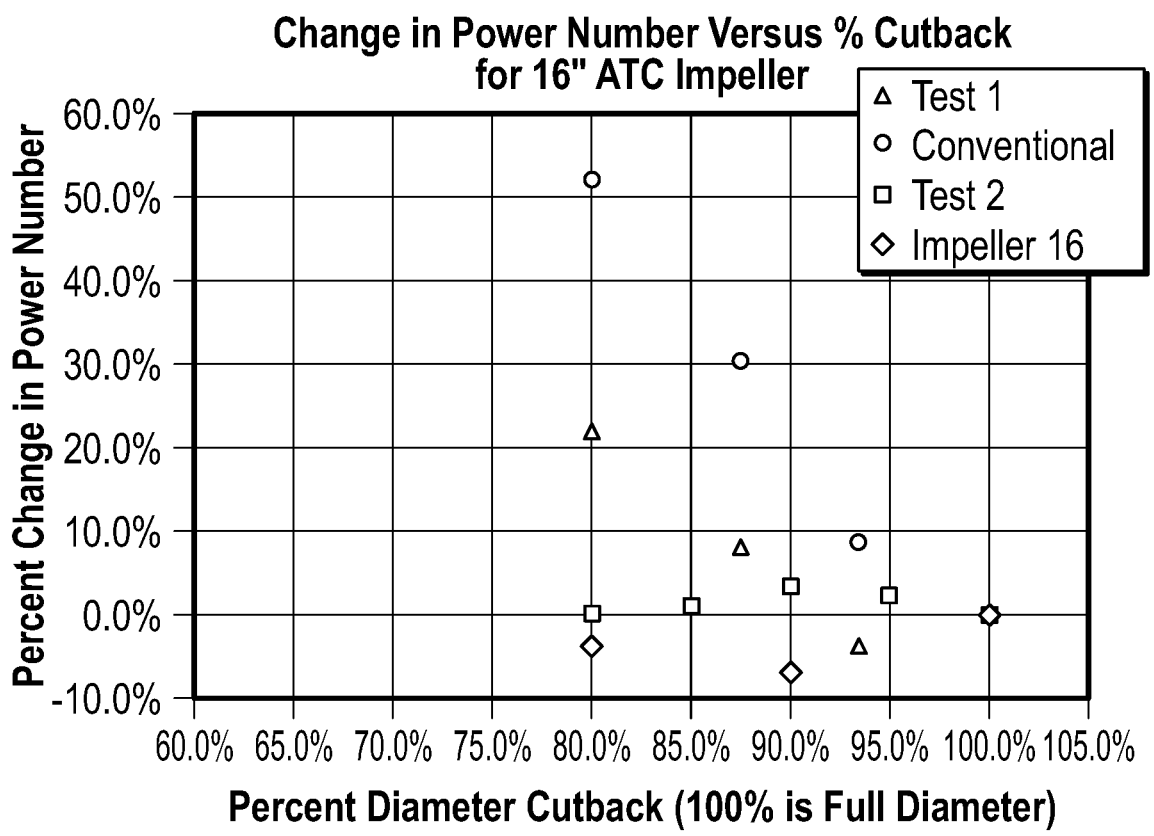
FIG. 9 is a graph showing change in power number verses change in diameter for different impellers.
Figure 10:
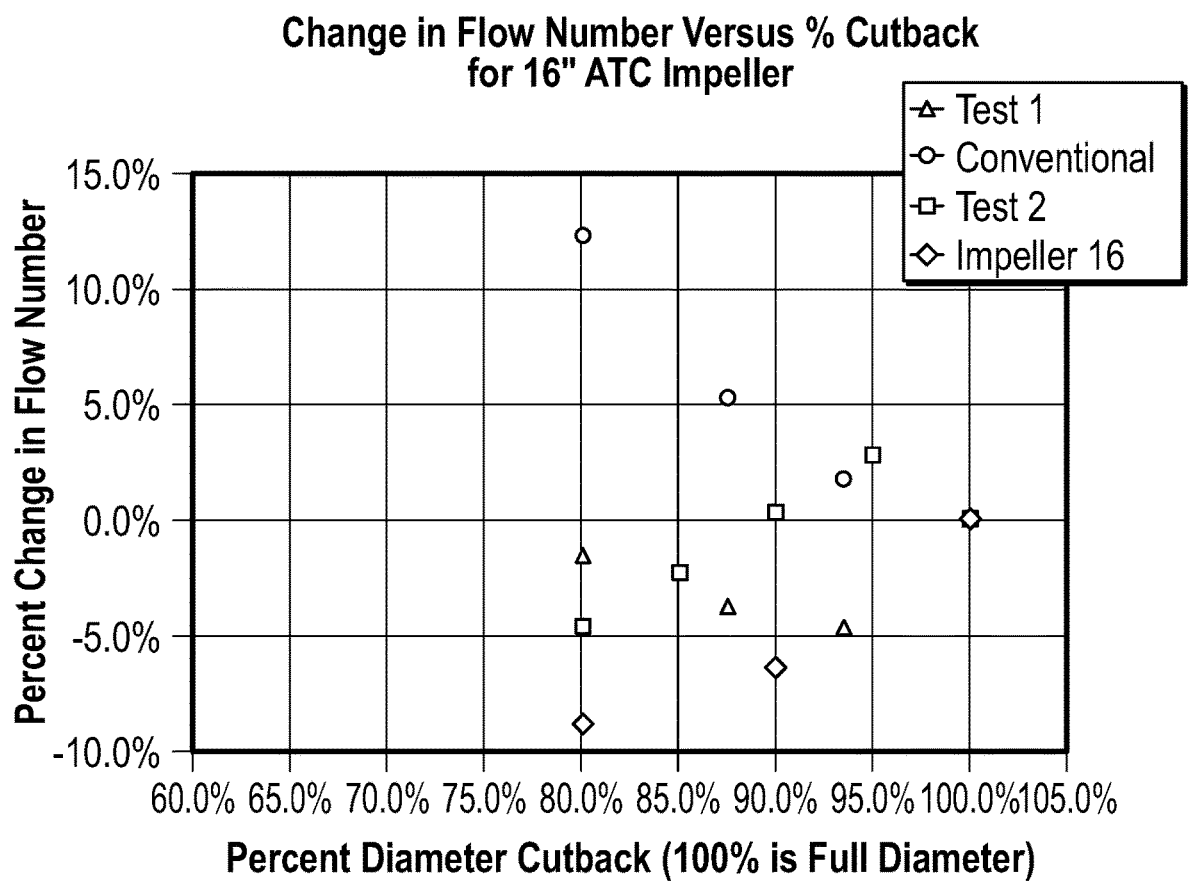
FIG. 10 is a graph showing change in flow number verses change in diameter for different impellers.

FIGS. 9 and 10 are graphs showing the change in power number and flow number, respectively, versus the change in diameter for different impellers. A given impeller has a unique power number, which relates the power drawn by the impeller to the impeller rotational speed and impeller swept diameter. Likewise, a given impeller has a unique flow number, which relates the amount of fluid pumped by the impeller to the impeller rotational speed and impeller swept diameter. These values remain constant for an impeller as long as the blade shape remains the same. With conventional impellers, both power number and flow number do not remain constant within an acceptable range as the impeller blade is cut back to change its diameter. An example of the unacceptable power numbers and flow numbers of a conventional impeller at various cut back diameters is shown in FIGS. 9 and 10. In contract, FIGS. 9 and 10 show the impeller 16 in this case has a power number that stays within 5.5% of the starting value as it is cut back and has a flow number that stays within 10% of the starting value as it is cut back.

Figure 11:
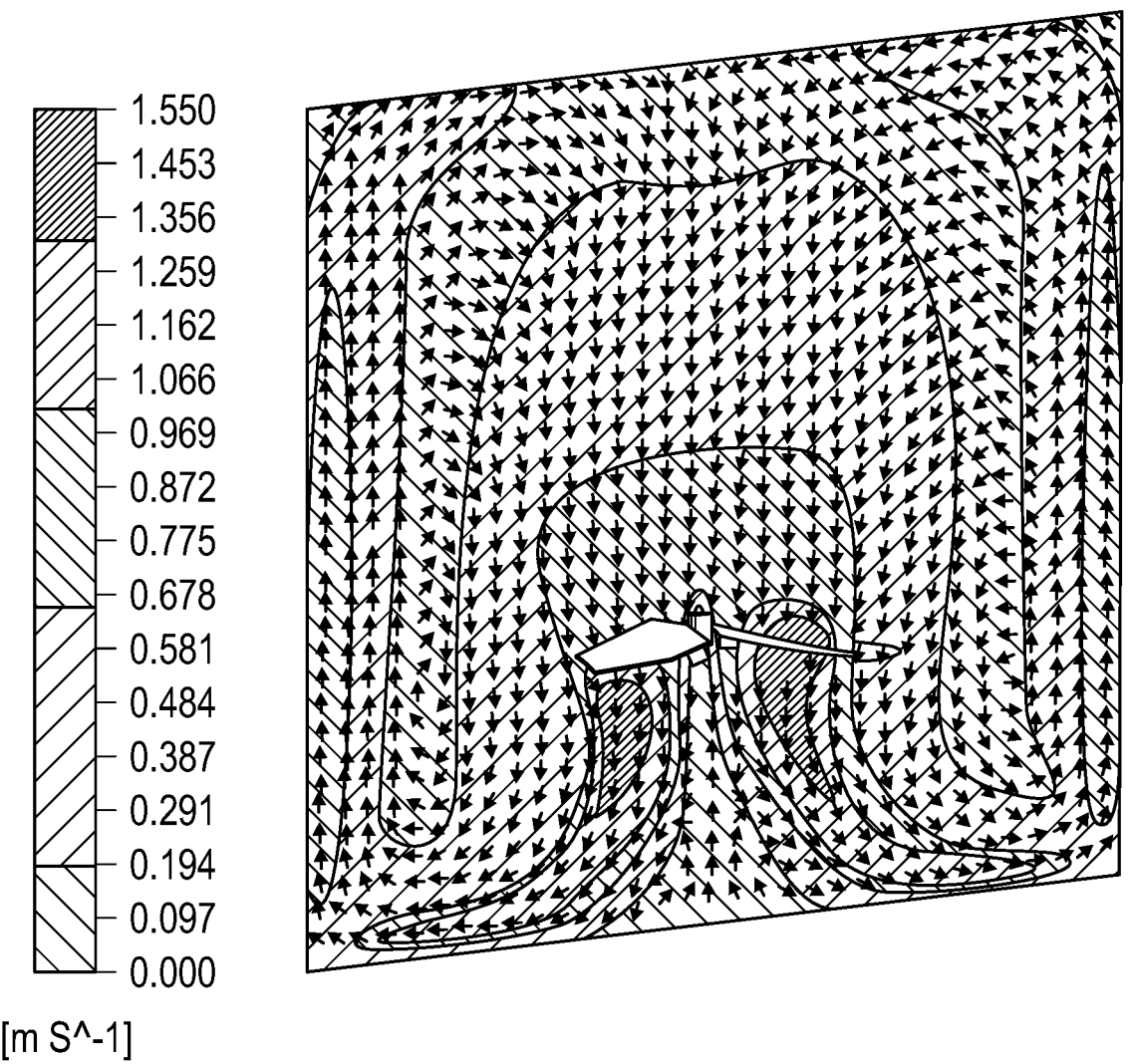
FIG. 11 is a view of flow within a container using the impeller at 100% diameter in accordance with an embodiment.
Figure 12:
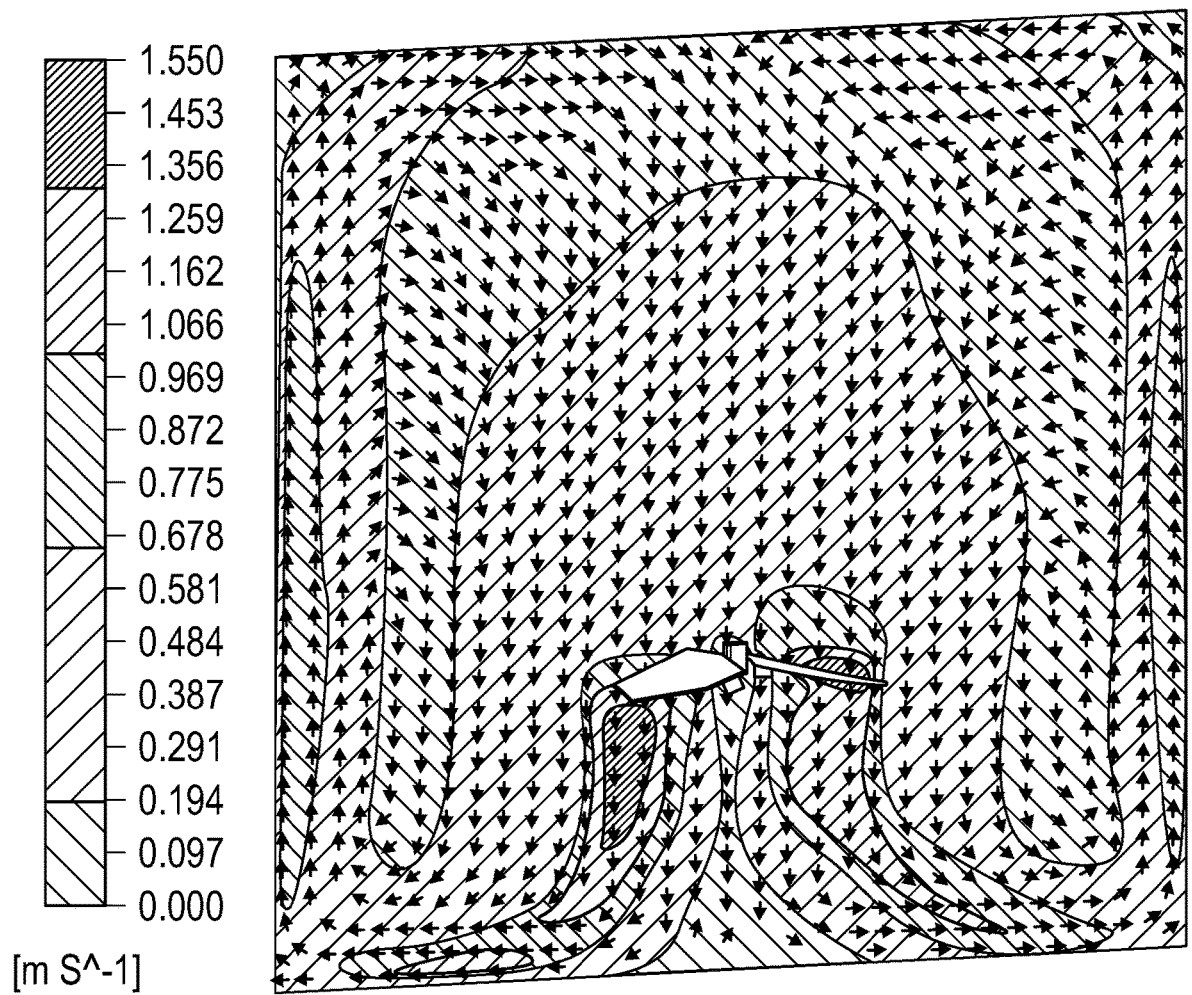
FIG. 12 is a view of flow within a container using the impeller at 80% diameter in accordance with an embodiment.

FIGS. 11 and 12 are views of flow within a container using the impeller 16 at 100% and 80% diameter in accordance with an embodiment. By comparing the FIGS. 11 and 12, it can be seen that, while there is a small decrease in velocity, the overall flow pattern is maintained and the impeller at both the 100% and 80% diameters have minimal low flow volumes.

Figure 14:
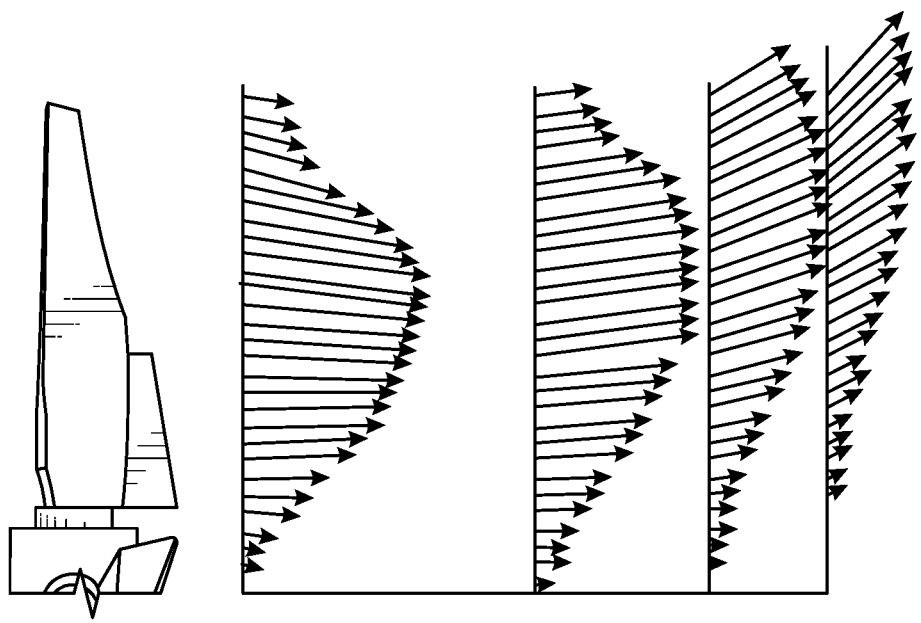
FIG. 14 is a view of flow performance characteristics of the blade at 80% diameter in accordance with an embodiment.
Figure 13:
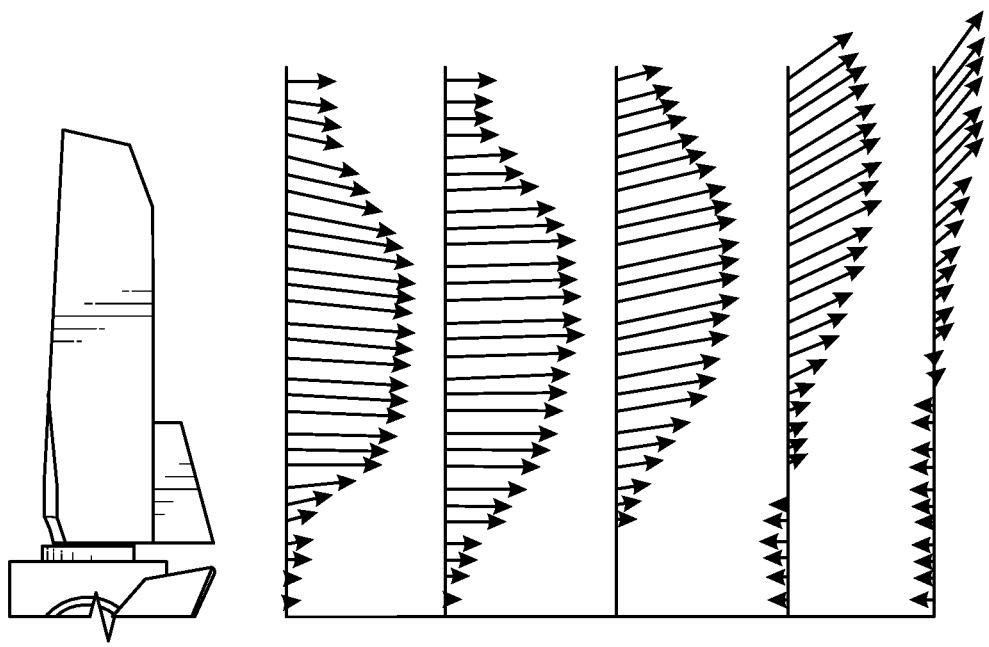
FIG. 13 is a view of flow performance characteristics of the blade at 100% diameter in accordance with an embodiment.

FIGS. 13 and 14 are views of flow performance characteristics of the blade 30 at 100% and 80% diameter in accordance with an embodiment. By comparing FIGS. 11 and 12, it can be seen that flow velocity is high and relatively even along a majority of the length of the blade 30 at both 100% and 80% diameters. That is, the blade 30 at both 100% and 80% diameters generates flow velocity relatively evenly along its length. This even generation of flow velocity improves flow characteristics in a container and reduces fluid shear.

Figure 15:
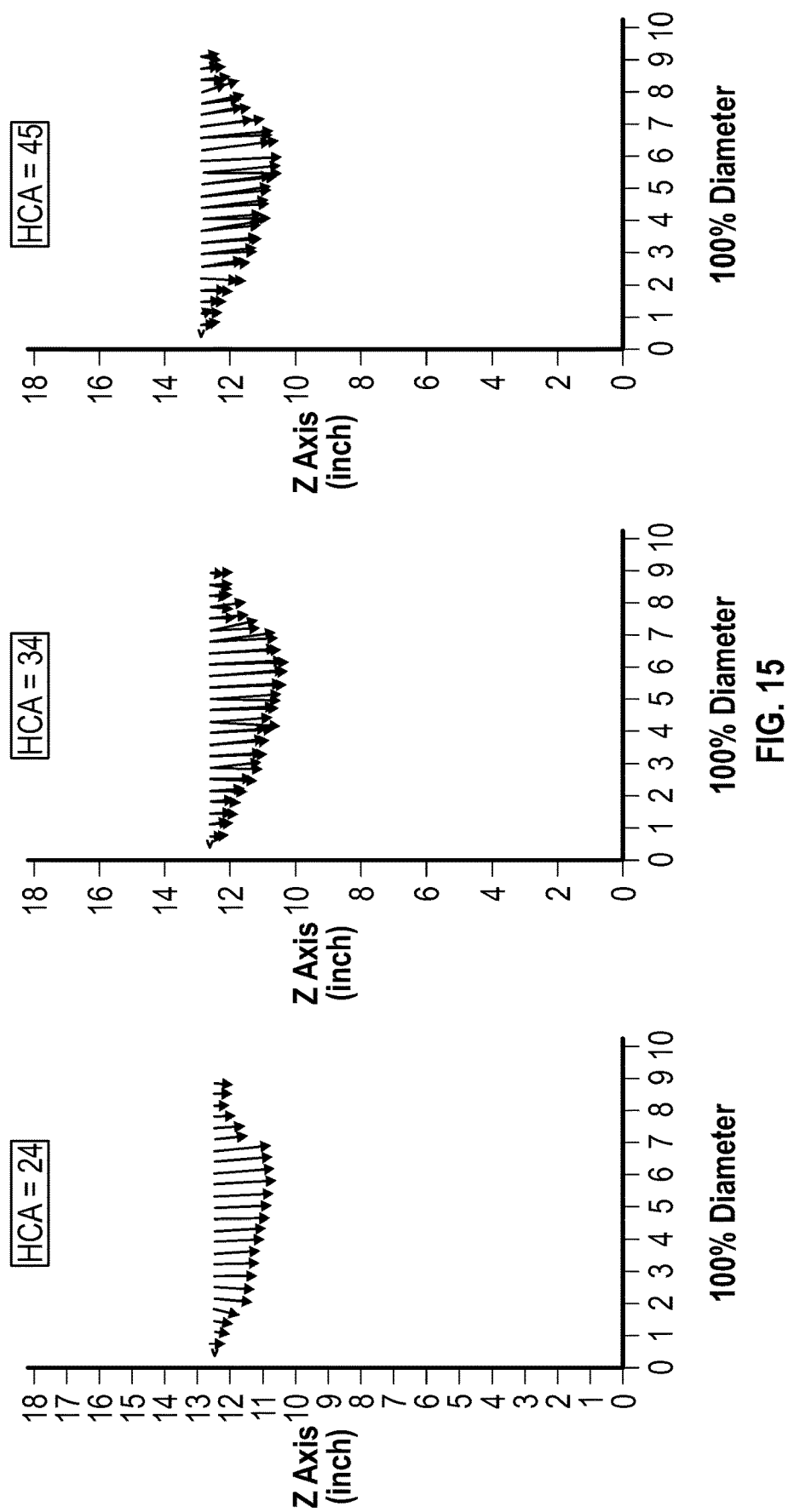
FIG. 15 is a view showing flow performance characteristics at different hub chord angles for the impeller at 100% diameter.
Figure 16:
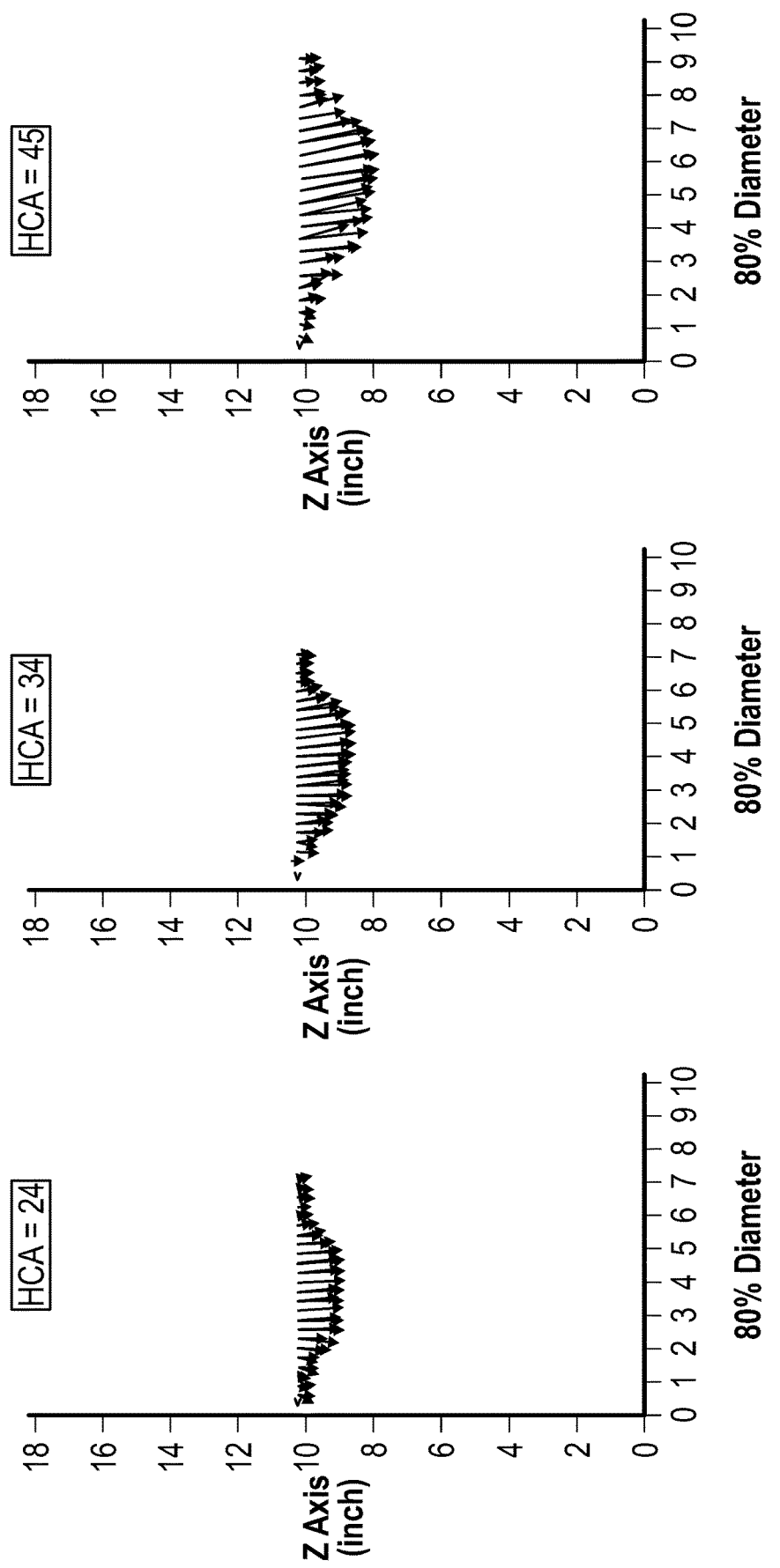
FIG. 16 is a view showing flow performance characteristics at different hub chord angles for the impeller at 80% diameter.

FIGS. 15 and 16 are views showing flow performance characteristics at different hub chord angles for the impeller 16 at 100% and 80% diameter. As shown in FIGS. 15 and 16, across the range of hub chord angles from 24° to 45°, the flow generated by the impeller 16 remains axial at both 100% and 80% diameters. That is, the flow is substantially in line with a central axis of the impeller 16.

Figure 17:
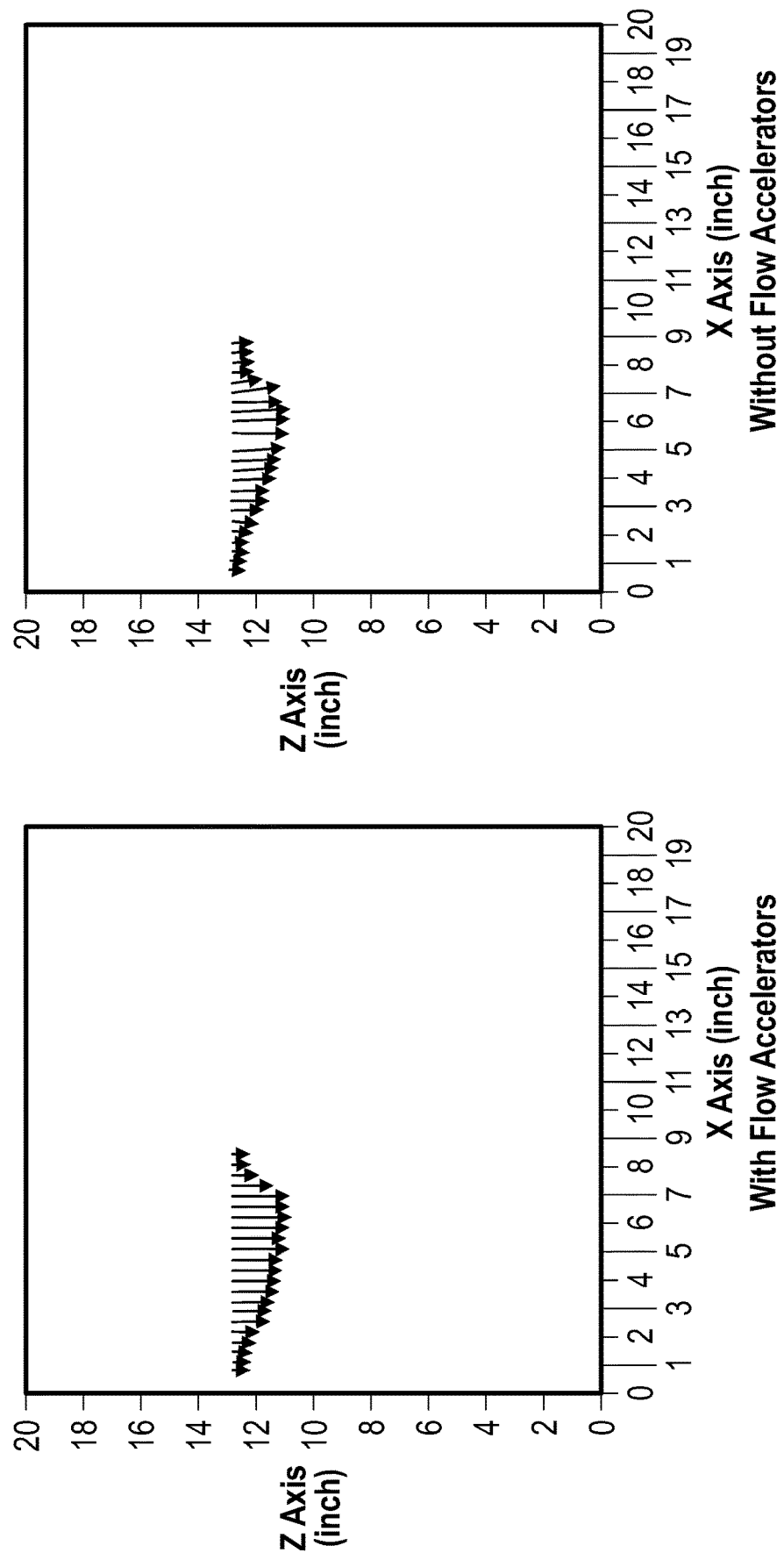
FIG. 17 is a view showing flow performance characteristics with and without a flow accelerator in accordance with an embodiment.

FIG. 17 is view showing flow performance characteristics with and without a flow accelerator in accordance with an embodiment. As shown in FIG. 17, the flow accelerators 144 increase flow by 5% with less than a 1% increase in power input.

FIG. 18 is a side view of the impeller 16 showing tip chord angle, hub chord angle, and twist in accordance with an embodiment. As shown in FIG. 18, the TCA is a measurement of the chord angle at the tip 38, the HCA is a measurement of the chord angle at the hub 36 and the twist is difference between the HCA and the TCA. In addition, an accelerator chord angle (ACA) is a measurement of the chord angle of the flow accelerator 144. Each of the HCA, TCA, and ACA are measured from a horizontal plane 50 of the impeller 16. The impeller plane or horizontal plane 50 is defined by a circle transcribed by rotation of the respective tips 38 about the hub 32.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A method of trimming an impeller comprising the steps of:
providing the impeller, the impeller comprising:
a hub; and
a plurality of blades, each blade extending out from the hub, the impeller having an original diameter defined by respective tips of the plurality of blades, wherein each blade includes:
a central axis;
a leading edge;
a trailing edge; and
a first profile having an outside portion and a trailing portion, the outside portion having an angle within a range of 40° to 90° from the central axis and the trailing portion having an angle within a range of 10° to 50° from the central axis; and
trimming the impeller to a second profile comprising the steps of:
cutting each blade along a respective first line parallel to the outside portions,
cutting each blade along a respective second line parallel to the trailing portion, and
intersecting the first line and the second line at a chord length from the leading edge, wherein the chord length is defined by the following equation:

$$C = -0.02*D^2 + 0.8*D - 6.2 \qquad \text{Eq. 1}$$

wherein C is the chord length and D is a diameter of the impeller defined by respective tips of the plurality of blades generated by cutting along the first line.

2. The method according to claim 1, wherein the outside portion has an angle of 85°±10° from the central axis and the trailing portion has an angle of 30°±10° from the central axis.

3. The method according to claim 1, wherein the impeller further includes a respective flow accelerator disposed on each blade and each respective flow accelerator being a flap extending from a portion of the trailing edge proximal to the hub.

4. The method according to claim 3, wherein the flow accelerators extend from the respective trailing edges at the same angle or at a steeper angle with respect to a horizontal line than a hub chord angle of each respective blade.

* * * * *